Patented July 24, 1951

2,561,667

UNITED STATES PATENT OFFICE 2,561,667

STABILIZATION OF FURFURYL ALCOHOL

Louis E. Klein, St. Louis, Mo., assignor to Monsanto Chemical Company, St. Louis, Mo., a corporation of Delaware No Drawing. Application May 12, 1949,
Serial No. 92,947

2 Claims. (Cl. 260—345)

This invention relates to furfuryl alcohol; more specifically, this invention relates to a new composition of matter comprising furfuryl alcohol and a minor amount of tetrahydrocaffeine thereby obtaining a furfuryl alcohol composition having exceptional resistance to resinification or polymerization.

Furfuryl alcohol is an excellent organic solvent for synthetic and natural resins and many other organic materials. It is miscible with water, alcohol, chloroform, ether, coal tar solvents and most other non-paraffinic solvents. A number of the uses of furfuryl alcohol are based on its rapid resinification, particularly in the presence of acidic catalysts. The ease with which furfuryl alcohol polymerizes is evidenced by the tendency of the pure material to deteriorate on storage causing the development of color, acidity, moisture and eventually a relatively insoluble sediment or precipitate. While such deterioration of the pure material takes place over a relatively long period of time, in the presence of acidic materials such as organic or inorganic acids, this polymerization occurs in a relatively short period of time, such as a matter of minutes. While in some applications this property of furfuryl alcohol may be desirable, in other applications obviously it is not. Thus in an application utilizing furfuryl alcohol solely as a solvent, its tendency to polymerize would be detrimental.

It is an object of this invention to provide a stabilized furfuryl alcohol. It is a further object of this invention to provide a stabilized furfuryl alcohol characterized by an outstanding resistance to polymerization or resinification even in the presence of highly acidic materials.

It has now been discovered that the tendency of furfuryl alcohol to polymerize can be substantially eliminated if there is incorporated into the furfuryl alcohol a minor amount of tetrahydrocaffeine, having the formula:

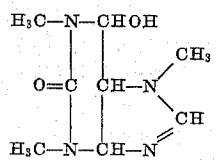

The novel stabilized furfuryl alcohol compositions of this invention are prepared by dissolving a minor amount of tetrahydrocaffeine in furfuryl alcohol in any convenient manner. While the quantity of tetrahydrocaffeine utilized is dependent upon the degree of stability desired, furfuryl alcohol compositions containing from about 0.05% to about 5.0% by weight of tetrahydrocaffeine, based on furfuryl alcohol, have been found to be particularly advantageous. Concentrations of tetrahydrocaffeine in excess of about 5.0%, by weight of furfuryl alcohol, do not significantly increase the stability of the composition over that of a furfuryl alcohol containing about 5.0% by weight of tetrahydrocaffeine.

The tetrahydrocaffeine utilized in the novel compositions of this invention is a white crystalline material having a melting point of about 195° to about 196° C. It may be prepared as follows:

76.5 g. of dry 5,6-diamino-uracil sulfate, 76.5 ml. of water and 310 ml. of a 2% formic acid solution are charged to a glass reactor equipped with a thermometer, agitator and reflux condenser. With continuous agitation and at a temperature of about 30° C., 7.65 g. of zinc dust and 10.6 ml. of an 85% formic acid solution are slowly added. 28.6 g. of sodium formate is then added and the reaction mixture refluxed for about four hours. The reaction mixture is then filtered and the filter cake washed with water. This solid material is composed of predominantly 5-amino-6-formamido-tetrahydrouracil.

55 g. of the above described dry crude 5-amino-6-formamido-tetrahydrouracil is then added to 490 ml. of water in an autoclave. With continuous agitation and at a temperature of about 90° C., the material is methylated with methyl chloride under 70 pounds per square inch pressure with continuous addition of a 49% aqueous solution of sodium hydroxide so as to maintain a pH above about 7.5 and preferably about 10. Methylation is continued for about eight hours after which time the reaction mixture is allowed to cool causing the crystallization of tetrahydrocaffeine. The crystals are filtered and recrystallized from hot water thereby obtaining substantially pure tetrahydrocaffeine.

The outstanding stabilizing activity of tetrahydrocaffeine is illustrated by the following examples:

Example I

Substantially pure furfuryl alcohol on standing for several months in a glass container at room temperature, shows a significant increase in color and acidity, indicating a slow degree of polymerization. A similar sample of furfuryl alcohol containing about 1% by weight of tetrahydrocaffeine, shows no increase in color or acidity on standing for a similar period and under similar storage conditions.

Example II

A mixture comprised of 15% acetic acid, 15% furfuryl alcohol and 70% water developed a large tarry precipitate on standing for about 36 hours at about 27° C., indicating a considerable degree of polymerization. A similar solution comprised of 15% furfuryl alcohol, 15% acetic acid, 1.5% tetrahydrocaffeine and 68.5% water after standing for one week at about 27° C., was as clear and free from sediment and precipitation as when originally prepared, clearly showing the outstanding stabilization characteristic of tetrahydrocaffeine.

What is claimed is:

1. A composition of matter comprised of furfuryl alcohol and a minor amount of tetrahydrocaffeine.

2. A composition of matter comprising furfuryl alcohol and from about 0.05% to about 5.0% by weight, based on furfuryl alcohol, of a compound having the formula $$\begin{array}{c} H_2C-N-CHOH \\ | \quad\quad | \quad\quad CH_3 \\ O=C \quad CH-N \\ | \quad\quad | \quad\quad CH \\ H_3C-N-CH-N \end{array}$$

LOUIS E. KLEIN.

REFERENCES CITED

The following references are of record in the file of this patent:

UNITED STATES PATENTS

| Number | Name | Date |
|---|---|---|
| 2,346,425 | Kirkpatrick | Apr. 11, 1944 |
| 2,436,764 | Copelin | Feb. 24, 1948 |

OTHER REFERENCES

Dunlop: "Industrial and Engineering Chemistry," July 1942, page 817.